3,200,151
ARYLAMINOALKYL GUANIDINES
Robert Geoffrey William Spickett, Harpenden, Graham John Durant, Welwyn Garden City, and Patrick Michael Guy Bavin, Letchworth, England, assignors to Smith Kline & French Laboratories, Philadelphia, Pa., a corporation of Pennsylvania
No Drawing. Filed Feb. 7, 1962, Ser. No. 171,594
Claims priority, application Great Britain, Feb. 15, 1961, 5,709/61
4 Claims. (Cl. 260—564)

This invention relates to novel arylaminoalkylguanidine derivatives having pharmacological activity. In particular the compounds of this invention have sympathetic nervous system blocking activity and also show hypotensive and diuretic activity.

The novel arylaminoalkylguanidines of this invention are represented by the following structural formula:

FORMULA I

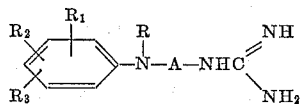

wherein:

A is an alkylene chain of 2 to 4 carbon atoms having at least 2 carbon atoms separating the hetero atoms to which it is attached;
R is hydrogen or lower alkyl; and
$R_1$, $R_2$ and $R_3$ are hydrogen, lower alkyl, lower alkoxy or halogen.

The preferred compounds of this invention have the following formula:

FORMULA II

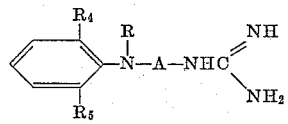

wherein:

A is an alkylene chain of 2 to 4 carbon atoms having at least 2 carbon atoms separating the hetero atoms to which it is attached;
R is lower alkyl preferably methyl; and
$R_4$ and $R_5$ are lower alkyl preferably methyl, lower alkoxy preferably methoxy or halogen preferably chloro.

An advantageous compound of this invention is 2-[N-methyl - N - (2,6-dimethylphenyl)amino]ethylguanidine.

The terms "lower alkyl" and "lower alkoxy" where used herein denote groups having 1 to 4 carbon atoms, preferably one carbon atom.

This invention also includes pharmaceutically acceptable salts of the above defined bases formed with non-toxic organic or inorganic acids. Suitable organic acids are, for example, maleic fumaric, ascorbic, acetic, citric, methane sulfonic, ethane disulfonic and benzene sulfonic. Exemplary of the preferred inorganic salts are those with hydrochloric, hydrobromic, hydriodic, phosphoric and sulfuric acids. The compounds of this invention can be isolated as their inorganic salts. A salt can be converted into the free base by treatment of a solution of the salt in ethanol with a base such as sodium ethoxide, preferably in an equimolar amount. The free base can be converted into other pharmaceutically acceptable, nontoxic, acid addition salts by treating with the appropriate organic or inorganic acid advantageously in a solvent such as ethanol, ether, or acetone.

The arylaminoalkylguanidines of this invention are prepared according to the following procedure:

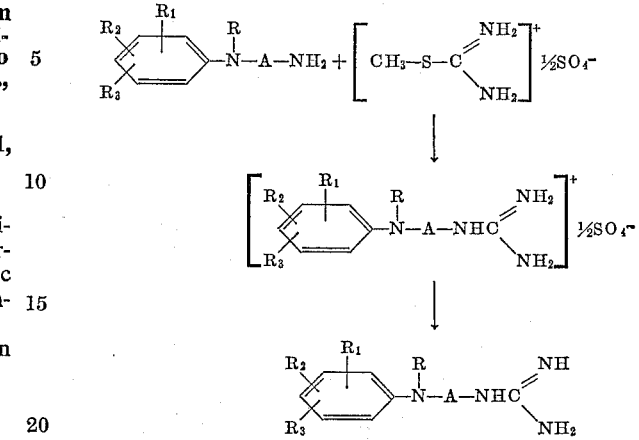

The terms A, R, $R_1$, $R_2$ and $R_3$ are as defined hereabove.

The diamine starting material is reacted with S-methyl thiourea in the form of a mineral acid salt such as, preferably, the sulfate salt. The reaction is carried out advantageously in water or in aqueous alkanol for example ethanol or methanol solution at elevated temperature conveniently at the reflux temperature of the reaction mixture for from about 1 to 24 hours preferably from about 2 to 6 hours. The guanidine product is isolated as the mineral acid salt and is converted to the free base by treatment with a base such as a sodium alkoxide preferably sodium ethoxide in ethanol.

The diamine starting materials are either known to the art or are prepared by reacting the appropriate aniline with substantially an equimolar amount of chloroacetonitrile in the presence of a base such as an alkali metal carbonate preferably potassium carbonate, sodium hydride or a tri-lower alkylamine such as triethylamine. The resulting cyanomethyl compound is reduced with lithium aluminum hydride to give the desired alkylenediamine.

Alternatively, the appropriate aniline is treated with a bromo-alkyl phthalimide to form a phthalimide intermediate which is then cleaved with hydrazine or hydrochloric acid to give the desired diamine starting material.

Another method by which the diamine starting materials, particularly the starting materials for the compounds of Formula II, may be prepared, is by reacting the appropriate aniline with aqueous formic acid to prepare the corresponding formyl derivative, which is then reacted with chloroacetonitrile in an organic solvent such as methyl ethyl ketone in the presence of a base such as potassium carbonate. The resulting cyano-methyl-formyl compound is reduced with lithium aluminum hydride to give the desired diamine starting material.

The following examples are not limiting but will serve to illustrate the compounds of this invention and the processes for their preparation.

*Example 1*

A solution of 2,6-xylidine (121 g.), formic acid (100 g.) and water is distilled through a distillation column. The residue solidifies on cooling and is treated with petroleum ether and filtered. Recrystallization from benzene-petroleum ether gives N-formyl-2,6-xylidine, M.P. 172–175° C.

A mixture of N-formyl-2,6-xylidine (25 g.), potassium carbonate (25 g.) and methyl ethyl ketone (100 ml.) is stirred and refluxed for one hour. Chloroacetonitrile (13.3 g.) is then added and the mixture refluxed for a further four hours.

The mixture is cooled, filtered and the solid washed with methyl ethyl ketone. The combined filtrates are concentrated in vacuo leaving an oil containing some solid. The oil is filtered using a little benzene and the filtrate is concentrated leaving N-cyanomethyl-N-formyl-2,6-xylidine as a brown oil.

The oil is reduced directly with lithium aluminum hydride in ether by heating at reflux for two hours. The mixture is cooled, treated with wet ether and water, filtered and the filtrate is exaracted with 2 N hydrochloric acid. The acid extracts are washed with ether, basified with 50% caustic soda solution and extracted with ether. Removal of the ether gives N-methyl-N-(2,6-xylyl)ethylenediamine, B.P. 80–88° C./0.07 mm.

S-methyl thiouronium sulfate (2.34 g.) is dissolved in water and 3.0 g. of N-methyl-N-(2,6-xylyl)ethylenediamine added. The resulting mixture is refluxed for two hours, then cooled to room temperature. The solid which separates is filtered, washed with ice cold water and dried. Recrystallization from methanol-isopropanol gives 2-[N-methyl-N-(2,6-xylyl)amino]ethylguanidine sulfate, M.P. 223–225° C.

The sulfate salt is dissolved in ethanol and treated with an equimolar amount of sodium ethoxide to give, after filtering and evaporating, 2-[N-methyl-N-(2,6-xylyl)amino]ethylguanidine.

*Example 2*

An aqueous solution of 5.5 g. of S-methyl thiouronium sulfate is treated with 6.0 g. of N-methyl-N-phenylethylenediamine. Refluxing for 2.5 hours, then cooling, filtering and recrystallizing from methanol-isopropanol gives 2-(N-methyl-N-phenylamino)ethylguanidine sulfate, M.P. 156–158° C.

The sulfate salt is treated with sodium ethoxide in ethanol to give 2-(N-methyl-N-phenylamino)ethylguanidine.

The free base in ethanol is treated with an excess of ethereal hydrogen chloride to give 2-(N-methyl-N-phenylamino)ethylguanidine hydrochloride.

*Example 3*

To an aqueous solution of 13.9 g. of S-methyl thiouronium sulfate is added 19.4 g. of N-ethyl-N-(4-methoxyphenyl)ethylenediamine. The resulting mixture is refluxed for 2.5 hours. Cooling, filtering and recrystallizing from methanol-isopropanol yields 2-[N-ethyl-N-(4-methoxyphenyl)-amino]ethylguanidine sulfate.

*Example 4*

A mixture of 27.0 g. of N-methyl-2,6-xylidine and 22.4 g. of bromopropylphthalimide is heated at 100° C. for 8 hours. The mixture is cooled, treated with water and extracted with ether. The ether extract yield 3-(N-methyl-2,6-xylylamino)propyl phthalimide.

This phthalimide is dissolved in ethanol and treated with 20 ml. of hydrazine hydrate. The solution is heated on the steam bath for 30 minutes, then filtered. The ethanol filtrate is concentrated in vacuo. The residue is converted to its hydrochloride salt with ethereal hydrogen chloride, recrystallized and then dissolved in water and neutralized to give N-methyl-N-(2,6-xylyl) propanediamine.

Ten grams of N-methyl-N-(2,6-xylyl)propanediamine is added to an aqueous solution of 7.0 g. of S-methyl thiouronium sulfate. Refluxing for three hours, cooling and filtering gives 3 - [N-methyl-N-(2,6-xylyl)amino]propylguanidine sulfate.

*Example 5*

By the procedure of Example 4 N-methyl-2,6-xylidine is reacted with bromo-butyl phthalimide and the resulting phthalimido compound is treated with hydrazine hydrate to give N-methyl-N-(2,6-xylyl)butanediamine.

To an aqueous solution of 7.0 g. of S-methyl thiouronium sulfate is added 10.3 g. of N-methyl-N-(2,6-xylyl)butanediamine. The mixture is refluxed for two hours, cooled and filtered. The solid product is 4-[N-methyl-N-(2,6-xylyl)amino]butylguanidine sulfate.

*Example 6*

By the procedure of Example 1, N-formyl-2,6-xylidine is reacted with a-bromopropionitrile in methyl ethyl ketone containing potassium carbonate. The resulting nitrile is reduced with lithium aluminum hydride in dry ether to give $N^2$ - methyl-$N^2$-(2,6-xylyl)-1,2-propanediamine.

A mixture of 13.9 g. of S-methyl thiouronium sulfate in water and 19.0 g. of $N^2$-methyl-$N^2$-(2,6-xylyl)-1,2-propanediamine is refluxed for 2.5 hours. Cooling, filtering and recrystallizing the solid from methanol-isopropanol gives 2 - [N-methyl-N-(2,6-xylyl)amino]propylguanidine sulfate.

*Example 7*

An aqueous solution of 7.0 g. of S-methyl thiouronium sulfate is treated with 6.8 g. of N-phenylethylenediamine. The resulting mixture is heated at reflux for two hours. Working up as in Example 1 gives 2-(N-phenylamino)ethylguanidine sulfate.

*Example 8*

An aqueous solution of 7.0 g. of S-methyl thiouronium sulfate is treated with 8.2 g. of N-(2-tolyl)propanediamine. Refluxing for two hours and working up as in Example 1 gives 3-[N-(2-tolyl)amino]propylguanidine sulfate.

The sulfate salt is treated with sodium ethoxide in ethanol to give 3 - [N-(2-tolyl)amino]propylguanidine. Reacting the free base with maleic acid in ethanol gives, after cooling and concentrating, 3-[N-(2-tolyl)amino]propylguanidine maleate.

*Example 9*

N-butyl-3-chloroaniline is reacted with an equimolar amount of chloroacetonitrile by the procedure of Example 1. The resulting nitrile is reduced with ethereal lithium aluminum hydride to give N-butyl-N-(3-chlorophenyl)ethylenediamine.

A mixture of 3.5 g. of S-methyl thiouronium sulfate and 5.6 g. of N - butyl-N-(3-chlorophenyl)ethylenediamine in water is refluxed for two hours. Cooling, filtering and recrystallizing the solid from methanol-isopropanol gives 2 - [N - butyl-N-(3-chlorophenyl)ethylenediguanidine sulfate.

*Example 10*

By the procedure of Example 4, 2,4,6-trichloro-N-methylaniline is reacted with bromo-ethylphthalimide and the resulting phthalimido compound is treated with hydrazine hydrate to give N - methyl-N-(2,4,6-trichlorophenyl)ethylene diamine.

By the procedure of Example 1, 3.5 g. of S-methyl thiouronium sulfate in water is refluxed with 6.0 g. of N - methyl - N-(2,4,6-trichlorophenyl)ethylenediamine to give 2 - [N-methyl-N-(2,4,6-trichlorophenyl)amino]ethylguanidine sulfate.

Similarly using N-methyl-2-methoxyaniline, N-methyl-3-bromoaniline, N-methyl-4-fluoroaniline and N-ethyl-2-ethylaniline as the starting materials in the above procedure 2 - [N-methyl-N-(2-methoxyphenyl)amino]ethylguanidine sulfate, 2 - [N - methyl - N - (3-bromophenyl) amino]ethylguanidine sulfate, 2-[N-methyl-N-(4-fluorophenyl)amino]ethylguanidine sulfate and 2-[N-ethyl-N-(2-ethylphenyl)amino]ethylguanidine sulfate respectively are obtained.

*Example 11*

2,6-dimethoxyaniline is converted to its N-formyl derivative, condensed with one equivalent of chloroacetonitrile and reduced with lithium aluminum hydride by the procedures described in Example 1 to give N-methyl-N-(2,6-dimethoxyphenyl)ethylenediamine.

An aqueous solution of 7.0 g. of S-methyl thiouronium sulfate is treated with 10.0 g. of N-methyl-N-(2,6-dimethoxyphenyl)ethylenediamine and the resulting mixture is refluxed for two hours. Cooling and filtering gives 2-[N - methyl-N-(2,6-dimethoxyphenyl)amino]ethylguanidine sulfate.

The free base is obtained by treating the sulfate salt with sodium ethoxide in ethanol.

Treating an ethanol solution of 2-[N-methyl-N-(2,6-dimethoxyphenyl)amino]ethylguanidine with an equimolar amount of citric acid in ethanol gives the citrate salt.

*Example 12*

By the procedure of Example 1 the following compounds are condensed with chloroacetonitrile, reduced with lithium aluminum hydride and the resulting diamines reacted with S-methyl thiouronium sulfate in aqueous solution:

N-2,4,6-tetramethylaniline
N-methyl-6-methoxy-2,4-xylidine

The following products were obtained:

2-[N-methyl-N-(2,4,6-trimethylphenyl)amino]ethylguanidine sulfate
2-[N-methyl-N-(6-methoxy-2,4-xylyl)amino]ethylguanidine sulfate.

What is claimed is:

1. A chemical compound of the class consisting of a free base and its addition salts with pharmaceutically acceptable acids, said free base having the formula:

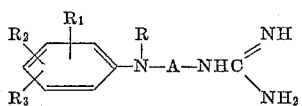

in which:
A is an alkylene chain of 2 to 4 carbon atoms having at least 2 carbon atoms separating the nitrogen atoms to which it is attached;
R is a member selected from the group consisting of hydrogen and lower alkyl; and
$R_1$, $R_2$ and $R_3$ are memebrs selected from the group consisting of hydrogen, lower alkyl, lower alkoxy, fluorine, chlorine and bromine.

2. A chemical compound of the formula:

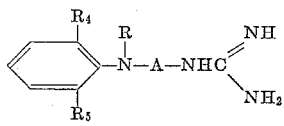

in which:
A is an alkylene chain of 2 to 4 carbon atoms having at least 2 carbon atoms separating the nitrogen atoms to which it is attached; and
R, $R_4$ and $R_5$ are lower alkyl.

3. A chemical compound of the formula:

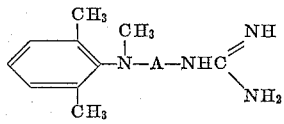

in which A is an alkylene chain of 2 to 4 carbon atoms having at least 2 carbon taoms separating the nitrogen atoms to which it is attached.

4. A chemical compound of the formula:

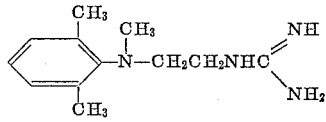

References Cited by the Examiner
UNITED STATES PATENTS

| | | | |
|---|---|---|---|
| 2,928,829 | 3/60 | Mull | 260—239 |
| 2,930,795 | 3/60 | Biel | 260—313 |
| 3,027,390 | 3/62 | Bindler | 260—564 X |
| 3,043,849 | 7/62 | Szmuszkovicz | 260—319 |
| 3,068,235 | 12/62 | Shapiro et al. | 260—293 |

FOREIGN PATENTS 506,282   8/30   Germany.

OTHER REFERENCES

McKay et al.: J.A.C.S., vol. 72, pp. 3659–3661 (1950).
Mull et al.: J. Org. Chem., vol. 25, pp. 1953 to 1956 (1960).
Scott et al.: J.A.C.S., vol. 75, pp. 4053 to 4054 (1953).

CHARLES B. PARKER, *Primary Examiner.*

L. ZITVER, *Examiner.*